United States Patent
Pan et al.

(10) Patent No.: US 11,083,010 B2
(45) Date of Patent: Aug. 3, 2021

(54) INTEGRATED ACCESS AND BACKHAUL ASSOCIATED WITH NR

(71) Applicant: IDAC Holdings, Inc., Wilmington, DE (US)

(72) Inventors: Kyle Jung-Lin Pan, Saint James, NY (US); Fengjun Xi, San Diego, CA (US); HaoHao Qin, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/542,367

(22) Filed: Aug. 16, 2019

(65) Prior Publication Data
US 2020/0059957 A1    Feb. 20, 2020

Related U.S. Application Data
(60) Provisional application No. 62/719,321, filed on Aug. 17, 2018.

(51) Int. Cl.
*H04W 74/00* (2009.01)
*H04W 74/08* (2009.01)
(Continued)

(52) U.S. Cl.
CPC ......... *H04W 74/006* (2013.01); *H04L 5/0053* (2013.01); *H04W 48/16* (2013.01); *H04W 72/1205* (2013.01); *H04W 74/0833* (2013.01)

(58) Field of Classification Search
CPC ............ H04W 84/047; H04W 74/008; H04W 74/0833; H04W 74/006; H04W 48/16;
(Continued)

(56) References Cited

U.S. PATENT DOCUMENTS 9,706,578 B2 *  7/2017  Zhang ............... H04W 74/0833
10,039,132 B2 *  7/2018  Lee .................... H04W 74/0833
(Continued)

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.
(Continued)

*Primary Examiner* — Man U Phan
(74) *Attorney, Agent, or Firm* — Condo Roccia Koptiw LLP

(57) ABSTRACT

Random access may be provided for integrated access and backhaul (IAB) for New Radio (NR). A wireless transmit/receive unit may send (e.g., to a gNB) a preamble in a random access occasion (RO). One or more of the preamble or an RO resource partition of the RO may indicate a node type of the WTRU. The WTRU may receive (e.g., from the gNB) a physical downlink control channel (PDCCH) that indicates (e.g., includes) one or more random access responses (RARs). The WTRU may determine that the PDCCH indicates a WTRU RAR and an integrated access and backhaul (IAB) node RAR. If the sent node type is a WTRU node type, the WTRU may receive (e.g., from the gNB) the WTRU RAR at a first time and frequency location indicated by the PDCCH.

13 Claims, 14 Drawing Sheets

(51) Int. Cl.
*H04W 72/12* (2009.01)
*H04L 5/00* (2006.01)
*H04W 48/16* (2009.01)

(58) Field of Classification Search
CPC . H04W 72/1205; H04W 74/00; H04W 74/08; H04W 72/12; H04L 5/0094; H04L 5/0053; H04L 5/0007; H04L 5/00
USPC .......................................................... 370/329
See application file for complete search history.

(56) References Cited

U.S. PATENT DOCUMENTS

| | | | | |
|---|---|---|---|---|
| 10,165,602 | B2* | 12/2018 | Yang | H04W 72/12 |
| 10,383,150 | B2* | 8/2019 | Babaei | H04W 72/042 |
| 10,470,221 | B2* | 11/2019 | Yang | H04W 74/08 |
| 10,750,543 | B2* | 8/2020 | Shi | H04W 74/0833 |
| 2018/0092139 | A1 | 3/2018 | Novlan et al. | |
| 2018/0115990 | A1 | 4/2018 | Abedini et al. | |
| 2018/0124718 | A1 | 5/2018 | Ng et al. | |
| 2019/0014533 | A1 | 1/2019 | Abedini et al. | |
| 2019/0053196 | A1 | 2/2019 | Abedini et al. | |
| 2019/0342904 | A1* | 11/2019 | Islam | H04B 7/15507 |
| 2020/0015180 | A1* | 1/2020 | Islam | H04W 56/005 |
| 2020/0100298 | A1* | 3/2020 | Pan | H04W 74/0833 |
| 2020/0145952 | A1* | 5/2020 | Keskitalo | H04W 56/0045 |
| 2020/0229242 | A1* | 7/2020 | Xiong | H04W 74/008 |

OTHER PUBLICATIONS

3rd Generation Partnership Project (3GPP), R1-1812568, "Power Control in IAB Scenario", LG Electronics, TSG RAN WG1 Meeting #95, Spokane, USA, Nov. 12-16, 2018, 04 pages.

3rd Generation Partnership Project (3GPP), R1-1812706, "Considerations of Single Panel vs. Multi-Panel Operation for IAB Node", Nokia, Nokia Shanghai Bell, TSG RAN WG1 Meeting #95, Spokane, USA, Nov. 12-16, 2018, 05 pages.

3rd Generation Partnership Project (3GPP), R1-1813417, "Enhancements to Support NR Backhaul Links", Qualcomm Incorporated, TSG RAN WG1 Meeting #95, Spokane, USA, Nov. 12-16, 2018, 21 pages.

* cited by examiner

INTEGRATED ACCESS AND BACKHAUL ASSOCIATED WITH NR

CROSS REFERENCE TO RELATED APPLICATIONS

This application claims priority to U.S. provisional patent application No. 62/719,321, filed Aug. 17, 2018, which is incorporated herein by reference in its entirety.

BACKGROUND

Use cases for fifth generation (5G) wireless communication systems may include Enhanced Mobile Broadband (eMBB), Massive Machine Type Communications (mMTC), and Ultra Reliable and Low latency Communications (URLLC). One or more different use cases may focus on different requirements such as higher data rate, higher spectrum efficiency, low power and higher energy efficiency, and/or lower latency and higher reliability. A range (e.g., wide range) of spectrum bands, e.g., ranging from 700 MHz to 80 GHz, may be considered for a variety of deployment scenarios.

SUMMARY

Random Access may be provided for integrated access and backhaul (IAB), e.g., for New Radio (NR). A wireless transmit/receive unit (WTRU) may send (e.g., to a gNB) a preamble in a random access occasion (RO). One or more of the preamble or an RO resource partition of the RO may indicate a node type of the WTRU. A first RO resource partition may indicate a WTRU node type and second RO resource partition may indicated an IAB node type. A preamble partition in the preamble may indicate the node type of the WTRU. A combination of the preamble partition and the RO resource partition may indicate the node type of the WTRU.

The WTRU may receive (e.g., from the gNB) a physical downlink control channel (PDCCH) that indicates (e.g., includes) one or more random access responses (RARs). The WTRU may determine whether a WTRU RAR is present and/or whether an integrated access and backhaul (IAB) node RAR is present, for example, using one or more indications in the PDCCH. The WTRU may determine that the PDCCH indicates scheduling information for the WTRU RAR and/or the IAB node RAR. The scheduling information may include one or more time and frequency locations associated with the WTRU RAR and/or the IAB node RAR. The IAB node RAR may be associated with a higher level of transmit power than the WTRU RAR. For example, the WTRU RAR may be received at a lower transmit power than the IAB node RAR. The WTRU may determine that the PDCCH indicates the WTRU RAR and the IAB RAR based on a first random access radio network temporary identifier (RA-RNTI) associated with the WTRU node type and a second RA-RNTI associated with the IAB node type. The PDCCH may include the first RA-RNTI and/or the second RA-RNTI. If the sent node type is a WTRU type, the WTRU may receive (e.g., from the gNB) the WTRU RAR at a first time and frequency location indicated by the PDCCH. If the sent node type is an IAB node type, the WTRU may receive (e.g., from the gNB) the IAB node RAR at a second time and frequency location.

BRIEF DESCRIPTION OF THE DRAWINGS

FIG. 10 illustrates an example TDMed and FDMed RACH occasions for WTRU and IAB.

DETAILED DESCRIPTION

Figure 1A:
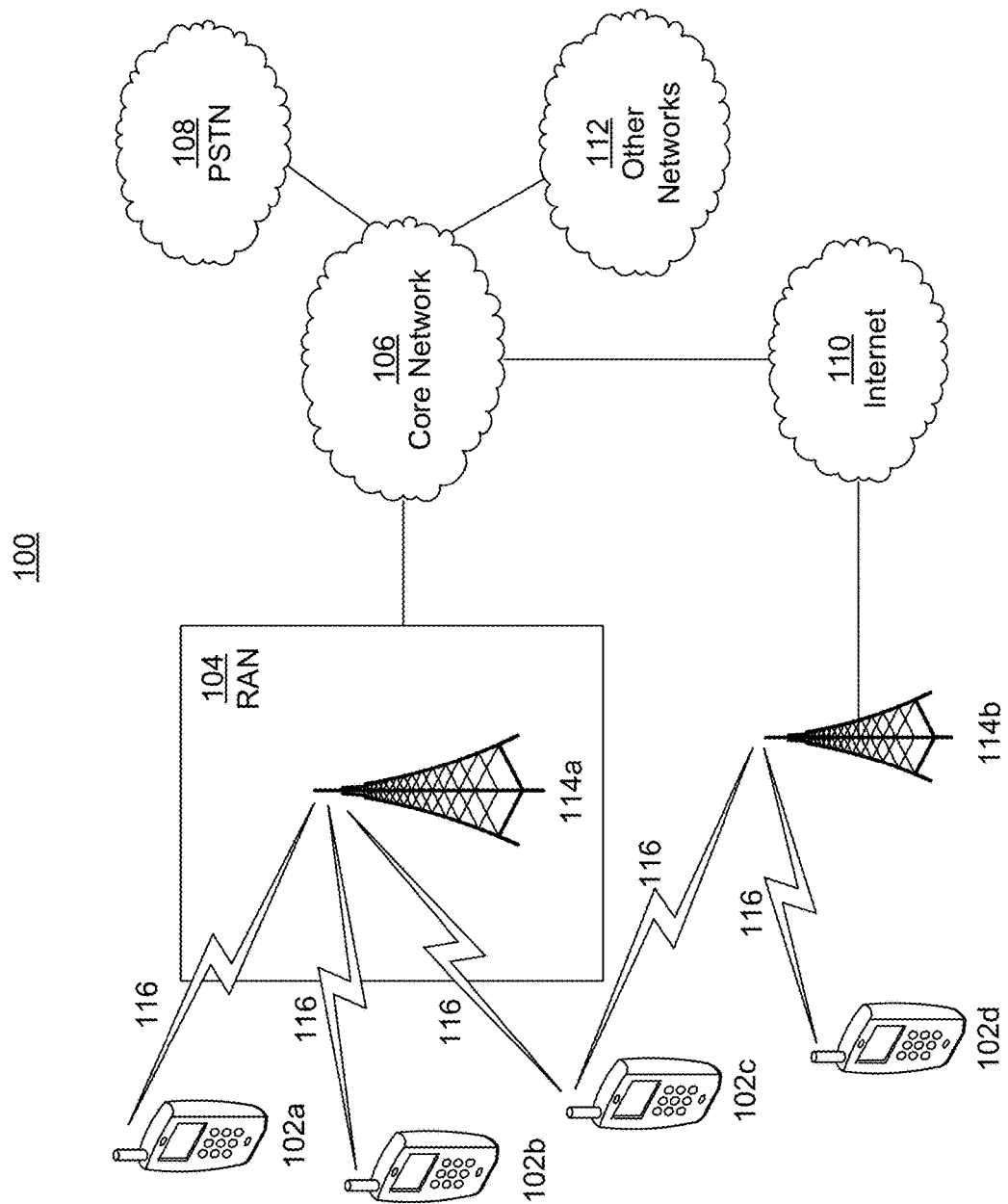
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
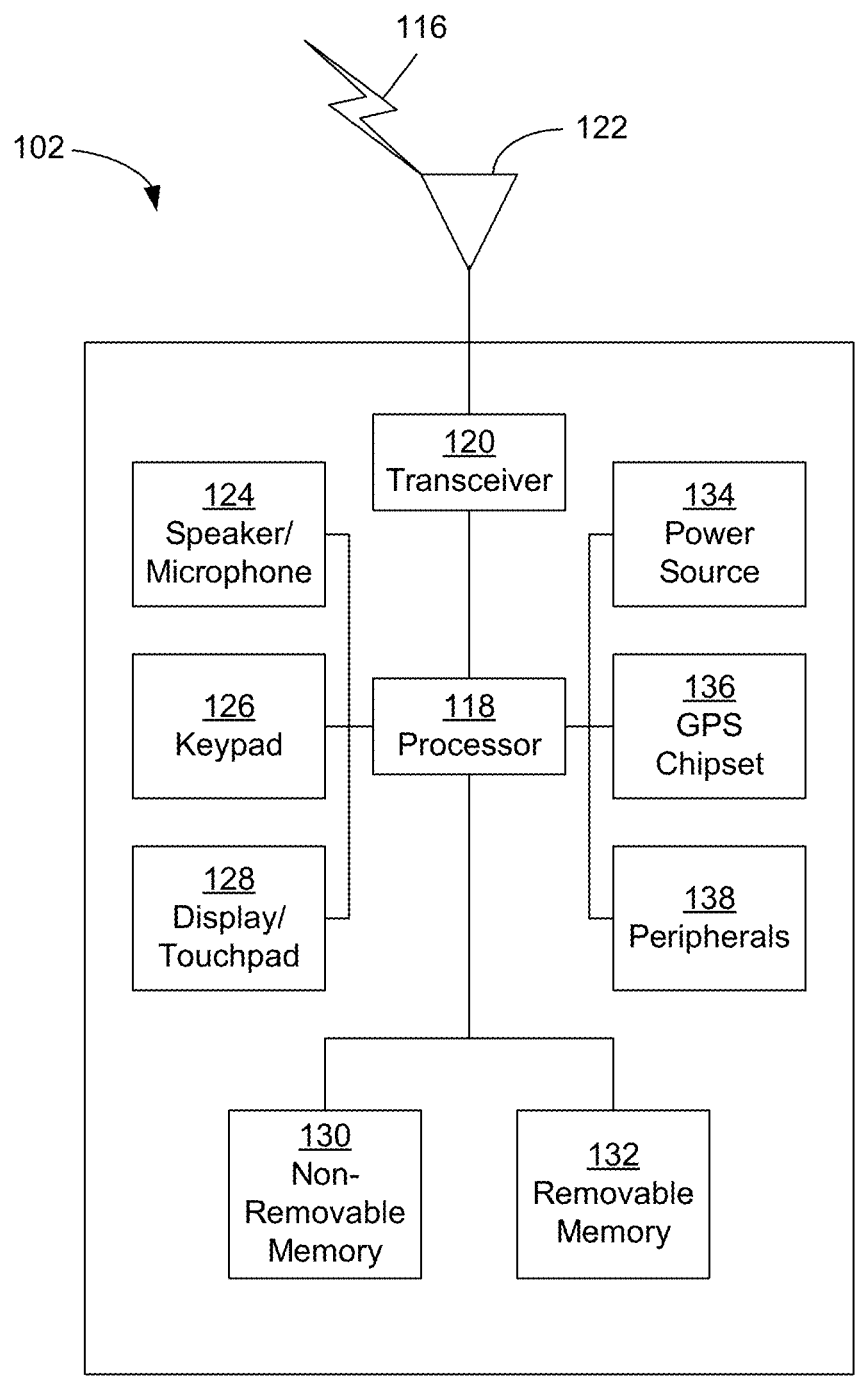
FIG. 1B is a system diagram illustrating an example wireless transmit/receive unit (WTRU) that may be used within the communications system illustrated in FIG. 1A according to an embodiment.
Figure 1C:
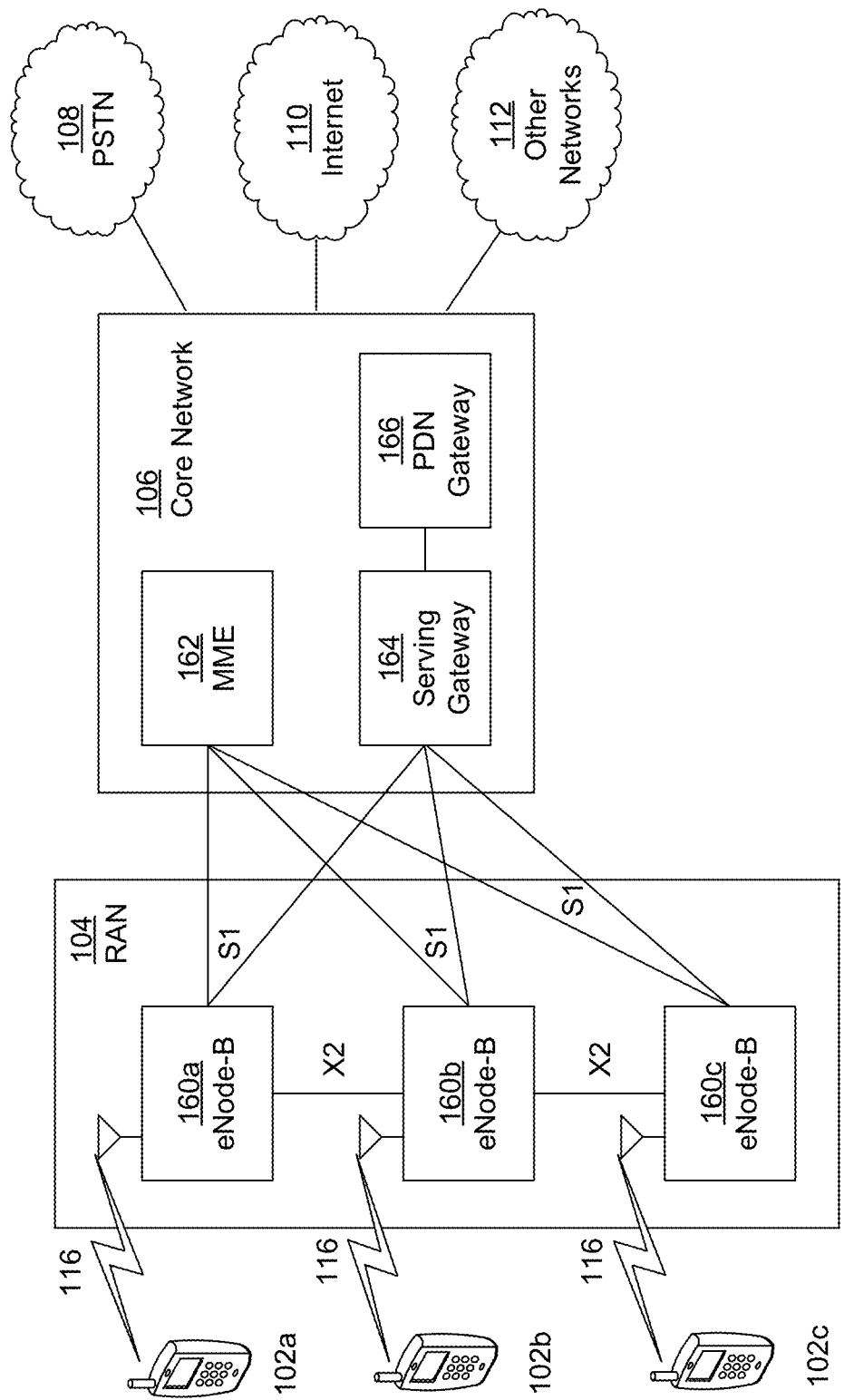
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
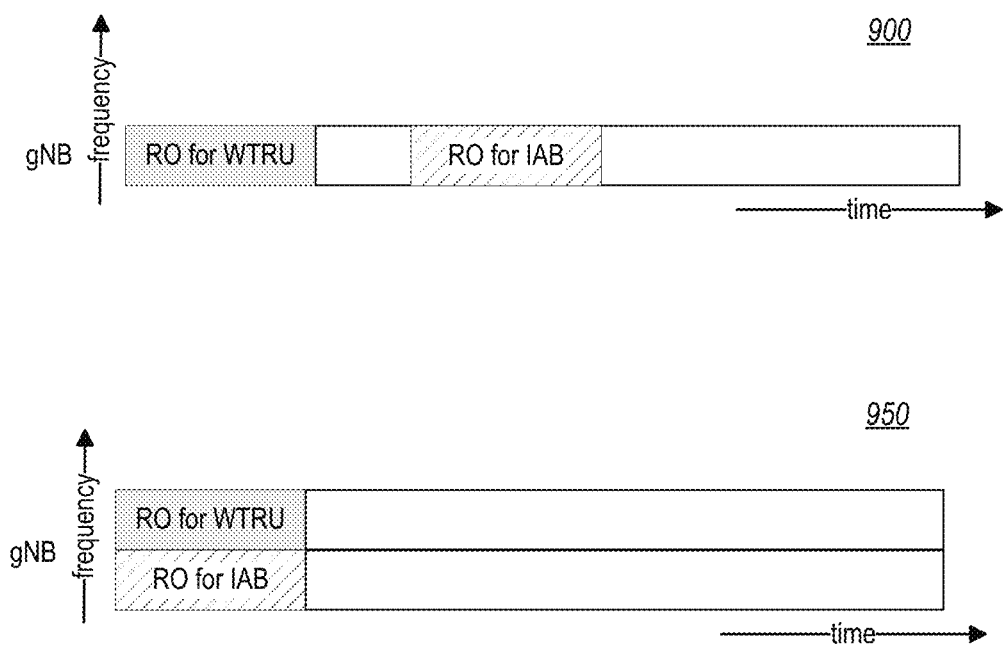
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
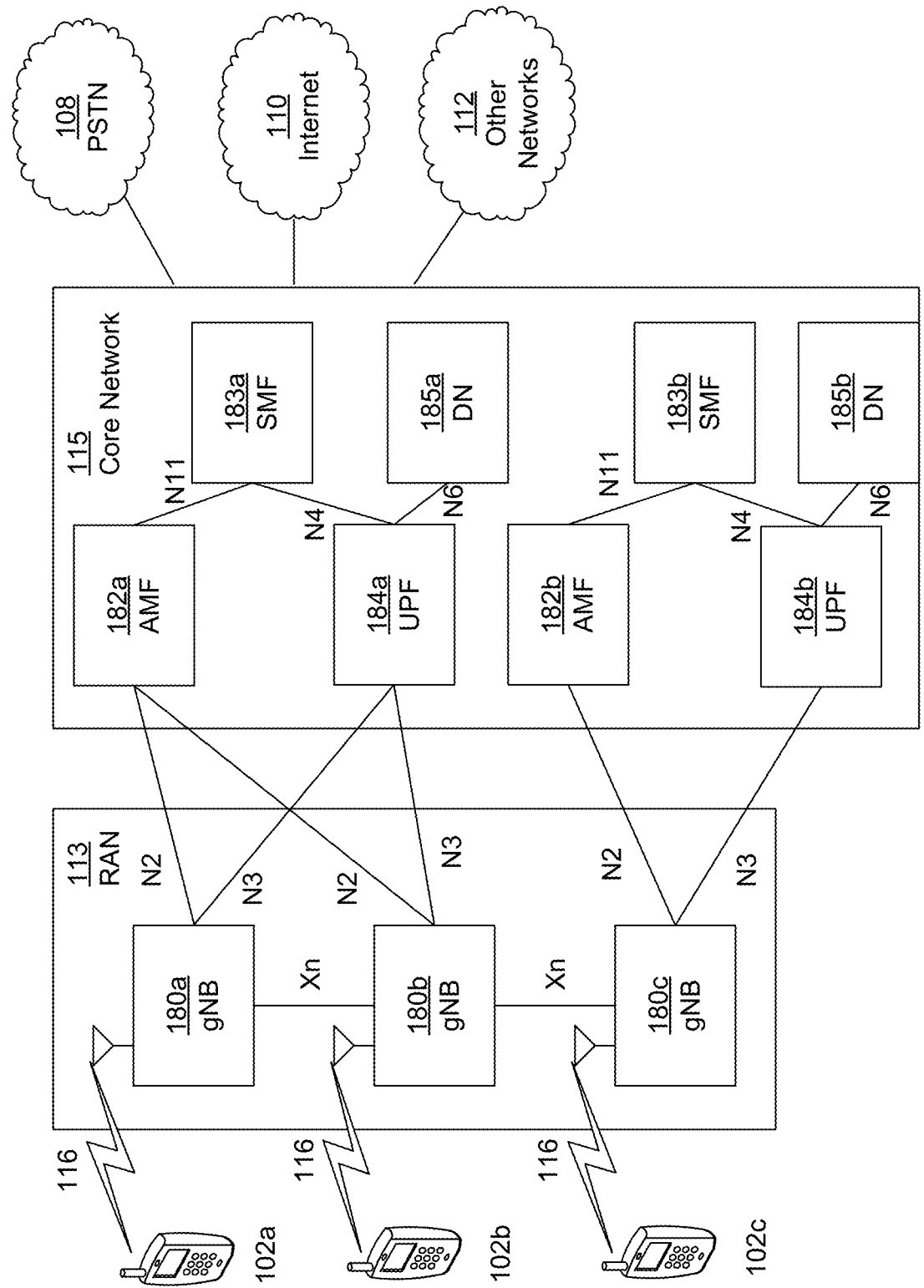

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As the carrier frequency increases, the path loss (e.g., severe path loss) may occur and may become a limitation to guarantee the sufficient coverage. Transmission in millimeter wave systems may suffer from non-line-of-sight losses, e.g., diffraction loss, penetration loss, Oxygen absorption loss, foliage loss, and/or the like. During initial access, a base station and a WTRU may overcome the high path losses described herein and may discover each other. Utilizing dozens or even hundreds of antenna elements to generated beam formed signal may be an effective way to compensate the severe path loss by providing significant beam forming gain. Beamforming techniques may include digital, analogue, and/or hybrid beamforming.

Integrated access and backhaul (IAB) may be provided for NR.

Figure 2:
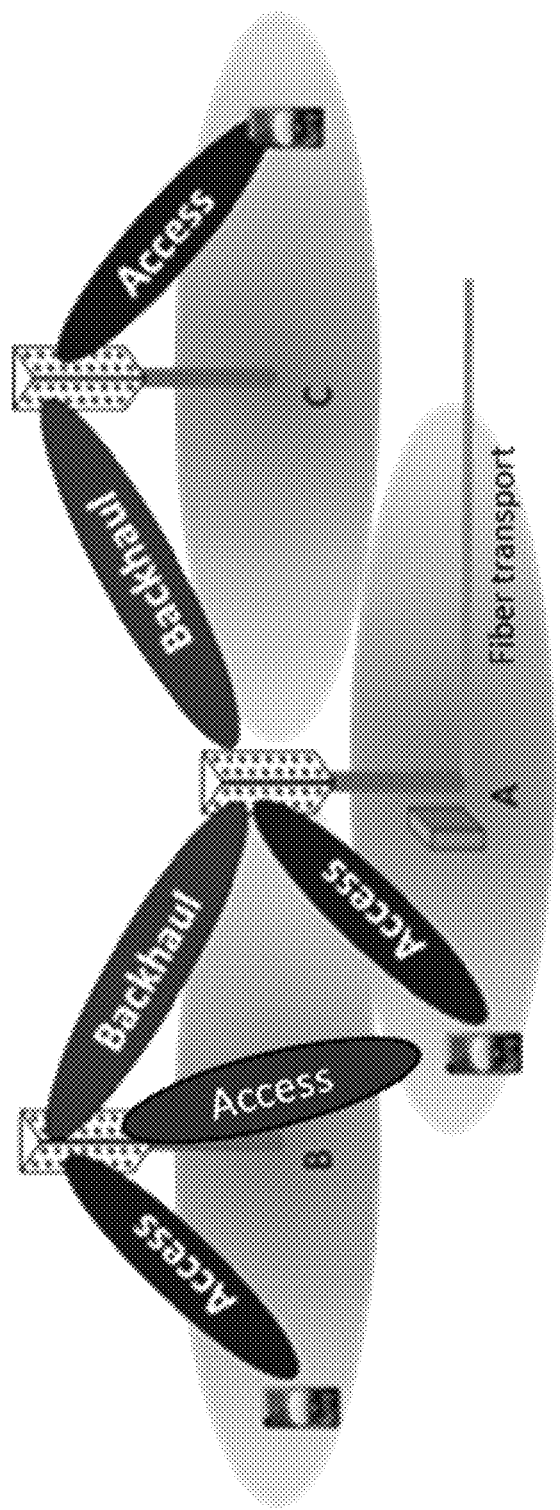
FIG. 2 illustrates an example network with an integrated access and backhaul (IAB) links.

Future cellular network deployment scenarios and/or applications may include support for wireless backhaul and/or relay links enabling flexible and/or dense deployment of NR cells (e.g., without densifying the transport network proportionately). NR may expect a larger bandwidth (e.g., larger bandwidth available for NR compared to LTE), in mmWave spectrum. Native deployment of massive MIMO and/or multi-beam systems in NR may develop and/or deploy one or more integrated access and backhaul (IAB) links. The development and/or deployment of one or more IAB links may allow easier deployment of a dense network of self-backhauled NR cells, e.g., in a more integrated manner. For example, the deployment may build upon one or more (e.g., many) of the control and/or data channels/procedures defined for providing access to WTRUs. FIG. 2 illustrates an example network with an integrated access and backhaul links. As shown in FIG. 2, relay nodes (rTRPs) may multiplex access and backhaul links in time, frequency, and/or space (e.g., beam-based operation).

The operation of the different links may be on the same or different frequencies (e.g., also termed in-band and out-band relays). Out-band relays may support one or more NR deployment scenarios. In-band relay operations may imply tighter interworking with the access links, e.g., operating on the same frequency to accommodate duplex constraints and/or avoid/mitigate interference. In examples, operating NR systems in mmWave spectrum may experience short-term blocking that may not be readily mitigated by present RRC-based handover mechanisms, e.g., due to the larger time-scales for completion of the procedures compared to short-term blocking. Fast RAN-based mechanisms for switching between rTRPs may overcome short-term blocking in mmWave systems and/or may not involve the core network. An integrated framework that allows fast switching of access and backhaul links may mitigate short-term blocking for NR operation in mmWave spectrum and/or may provide easier deployment of self-backhauled NR cells, as described herein. Over-the-air (OTA) coordination between rTRPs may be considered to mitigate interference and/or support end-to-end route selection and/or optimization.

IAB may be (e.g., may need to be) available when NR rollout occurs.

A RACH may be designed for WTRUs (e.g., WTRU in access link) and IAB nodes (e.g., IAB node in backhaul link), for example, in IAB systems. The access distance for an IAB node may be larger than the access distance for a WTRU. For example, the IAB node may be farther (e.g., much farther) from a gNB than the WTRU. RACH configurations and/or procedures (e.g., as described herein) may satisfy the RACH requirements for IAB nodes and WTRUs. To support the RACH transmission for IAB nodes and WTRUs, NR may include a NR PRACH configuration, a NR preamble format and preamble configuration, and/or a NR RACH procedure, e.g., to support the multiplexing of RACH transmissions from WTRUs and RACH transmissions from IAB-nodes.

A WTRU may perform radio link monitoring. If radio link failure (RLF) is declared (e.g., determined), the WTRU may perform random access (e.g., via a RACH) to re-access the network. In backhaul links, an IAB node may perform radio link monitoring that monitors the link with other IAB nodes. If an IAB node declares radio link failure, the IAB node and/or the children of the IAB node may be studied. When an IAB node is selecting its parent node, the IAB node may not depend on the reference signal received power (RSRP) of received synchronization signal blocks (SSBs) or SS/PBCH blocks from the candidate parent nodes. SSB and SS/PBCH block described herein may be used interchangeably. An IAB node may be constrained (e.g., due to half-duplex constraint). For example, due to the half-duplex constraint of IAB node, an IAB node may coordinate the transmission and/or receiving orthogonally in time. A resource for reference signals used for IAB node discovery may be designed such that when one IAB node is transmitting measurement signals other IAB nodes are monitoring. The resource allocation between backhaul links and access links in IAB may be considered. Time division multiplexing (TDM), frequency division multiplexing (FDM) and/or spatial division multiplexing (SDM) may be considered. The resource allocation type, dynamic or semi-static method may be considered. When FDM/SDM is used for multiplexing backhaul link and access link, cross link interference may occur and may be considered.

Random Access may be provided for IAB.

Figure 3:
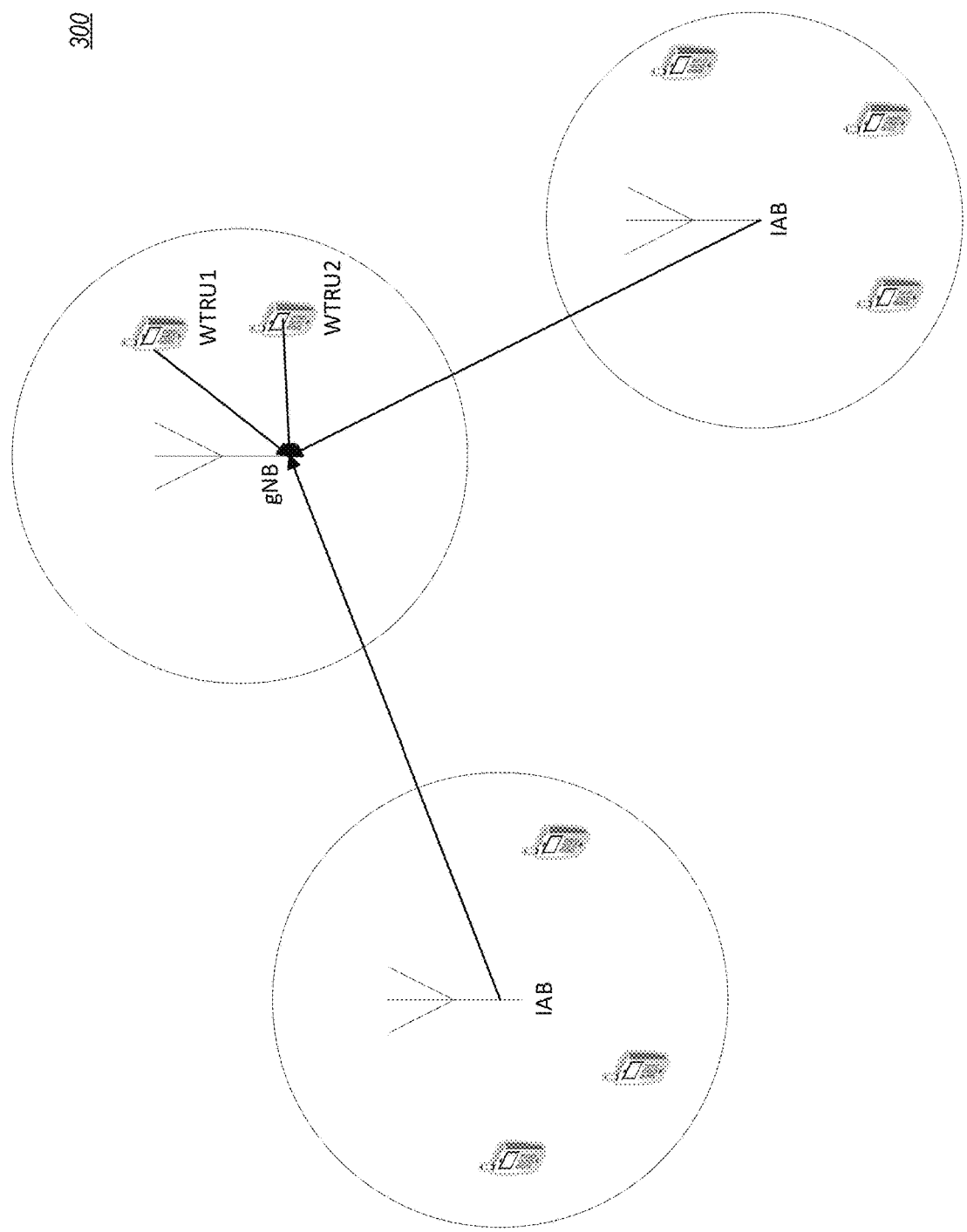
FIG. 3 illustrates an example of a WTRU and a IAB node performing random access channel (RACH) simultaneously.
Figure 4:
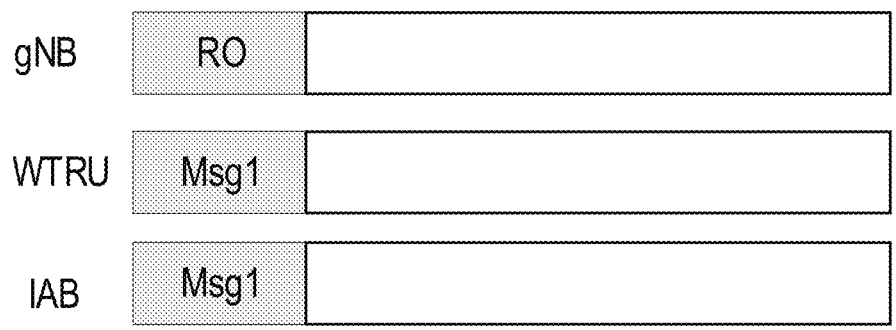
FIG. 4 illustrates an example of a WTRU and a IAB node sending preamble in the same RACH occasion (RO).

FIG. 3 illustrates an example RACH procedure 300 of a WTRU and an IAB node performing RACH simultaneously (e.g., simultaneously or near simultaneously). In integrated access and backhaul (IAB) systems, an IAB node and a WTRU may perform random access at the same RACH occasion (RO) to IAB-donor node (e.g., gNB), e.g., as shown in FIG. 3. RACH may be designed for a WTRU in an access link and an IAB node in a backhaul link, e.g., in IAB systems. The distance from a WTRU to an IAB-donor may be smaller than the distance from an IAB-node to the IAB-donor and may lead to different RACH requirements for the WTRU and the IAB-node. According to NR configuration, if a WTRU and an IAB-node select the same IAB-donor SSB, the WTRU and the IAB-node may send preambles in the same RACH occasion, as shown in FIG. 4. FIG. 4 illustrates an example preamble procedure 400 of a WTRU and an IAB node sending preambles in the same RO. After sending Msg1, the WTRU and IAB-node may monitor the random access response (RAR) (e.g., PDCCH, PDSCH) for RAR reception, as shown in FIG. 4.

IAB-based random access may be provided. In examples, IAB-based random access may use two or more (e.g., two) RAR transmissions. For example, one or more of the following two RAR transmissions may be used: a first RAR may be transmitted with high power while a second RAR may be transmitted with low power; the first RAR may be an IAB node-specific RAR while the second RAR may be a WTRU-specific RAR. In examples, a first RAR may be a backhaul link-specific RAR while a second RAR may be an access link-specific RAR. The IAB node-specific RAR and the WTRU-specific RAR may be sent using the same PDCCH or using separate PDCCHs, for example, to schedule the PDSCH for RAR transmission. If the IAB node-specific RAR and the WTRU-specific RAR are scheduled using the same PDCCH to schedule the PDSCHs for RAR transmission, then the same single PDCCH may carry the scheduling assignment for both the IAB node-specific RAR and the WTRU-specific RAR. An indication in PDCCH (e.g., indication in downlink control information or DCI) may be used to indicate whether the WTRU-specific RAR is present or absent. If the indication in PDCCH indicates that the WTRU-specific RAR is present, the WTRU may continue receiving the PDSCH for WTRU-specific RAR reception. If the indication in PDCCH indicates that the WTRU-specific RAR is absent (or not present), the WTRU may not continue receiving the PDSCH or may stop receiving the PDSCH for WTRU-specific RAR reception. Similarly, an indication in PDCCH (e.g., indication in downlink control information or DCI) may be used to indicate whether the IAB node-specific RAR is present or absent. If the indication in PDCCH indicates that the IAB node-specific RAR is present, the IAB node may continue receiving the PDSCH for IAB node-specific RAR reception. If the indication in PDCCH indicates that the IAB node-specific RAR is absent (or not present), the IAB node may not continue receiving the PDSCH or may stop receiving the PDSCH for IAB node-specific RAR reception. If the IAB node-specific RAR and the WTRU-specific RAR are scheduled using separate PDCCHs to schedule the PDSCHs for RAR transmission, the different separate PDCCHs may carry the scheduling assignment for each of the IAB node-specific RAR reception and the WTRU-specific RAR.

Figure 5:
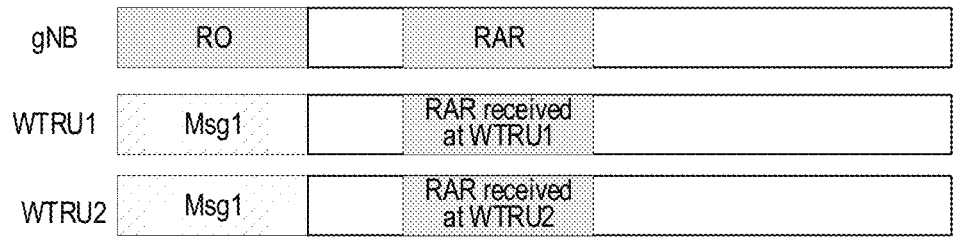
FIG. 5 illustrates an example of two WTRUs sending preambles in the same RO.

In examples, IAB-based random access may use one or more RA-RNTIs as a function of node type. In NR, if two WTRUs send preambles at the same RACH occasion, the gNB may send the same RAR for the two WTRUs. The RAR may include a CRC scrambled with RA-RNTI, which is a function of the symbol index, slot index, subframe index, and/or carrier index. FIG. 5 illustrates an example procedure 500 of two WTRUs sending preambles in the same RO.

Figure 6:
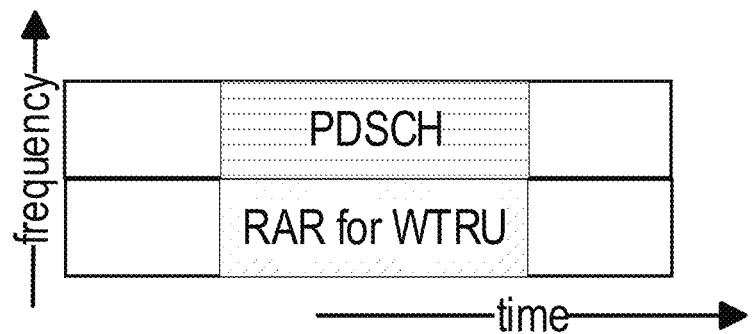
FIG. 6 illustrates an example random access response (RAR) reception.

In examples, when a WTRU and a IAB node send the preamble at the same RACH occasion, the distance between the IAB node and the IAB donor node may be larger than the distance between the WTRU and the IAB donor node (e.g., gNB), as shown in FIG. 3. The path loss and/or channel fading of the IAB node may be larger (e.g., much larger) than the path loss and/or channel fading of the WTRU. The IAB donor node may send the same RAR and/or PDCCH to the WTRU and the IAB node. The transmitting power of the RAR sent to both the WTRU and the IAB node may be high (e.g., high enough to meet the RAR reception requirement for IAB node), e.g., due to the distance difference. The transmitting power of the RAR to the WTRU may be larger (e.g., much larger) than that in an NR system and may cause potential interference to other WTRUs in the same or different cells. FIG. 6 illustrates an example RAR reception 600. As shown in FIG. 6, for the FDMed PDSCH and RAR for a WTRU, the RAR may have much larger power than PDSCH, which may increase the power consumption and/or complexity for an IAB donor node and/or may cause interference.

Figure 7:
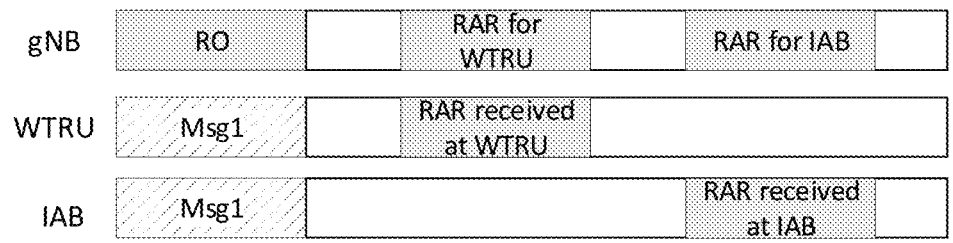
FIG. 7 illustrates an example of a WTRU and a IAB node sending preambles at the same RO.

FIG. 7 illustrates an example RAR procedure 700 of a WTRU and a IAB node sending preambles at the same RO. For example, the WTRU may send a first preamble to an IAB donor node in a RO and the IAB node may send a second preamble to the IAB donor node in the RO. The WTRU may receive, from the IAB donor node, a PDCCH that indicates one or more RARs. The IAB donor node may send a separate RAR/PDCCH to a WTRU and a IAB node, e.g., using a higher level of transmit power for an IAB-node RAR and a normal level of transmit power for a WTRU RAR (e.g., lower than that of the IAB-node RAR). In examples, the IAB donor node may send a PDCCH that includes both an IAB node RAR and a WTRU RAR. In examples, the IAB donor node may send a first PDCCH that includes the IAB node RAR and a second PDCCH that includes the WTRU RAR. The WTRU RAR may be associated with a first time and frequency location (e.g., as indicated by the PDCCH). The IAB node RAR may be associated with a second time and frequency location (e.g., as indicated by the PDCCH). For example, the WTRU RAR may be sent and received at the first time and frequency location and the IAB node RAR may be sent and received at the second time and frequency location, as illustrated in FIG. 7. In examples, the IAB donor node may send a first PDCCH (e.g., with higher power) that includes the IAB node RAR and a second PDCCH (e.g., with lower power than the first PDCCH) that includes the WTRU RAR.

The WTRU may be configured and determine that the PDCCH indicates one or more RARs. The WTRU may determine that the PDCCH indicates a WTRU RAR and an IAB node RAR using one or more RA-RNTI and/or one or more flags (e.g., in the PDCCH or DCI). The IAB donor node may send two separate RARs/PDCCHs with RA-RNTIs as a function of node type to the WTRU and the IAB node when the WTRU and the IAB node transmit preambles at the same RACH occasion, as shown in FIG. 7. For example, a first RA-RNTI may be associated with the WTRU node type and a second RA-RNTI may be associated with the IAB node type. The WTRU may determine that the PDCCH indicates the WTRU RAR and the IAB node RAR. If the sent node type is a WTRU node type, the WTRU may receive the WTRU RAR at a first time and frequency location. If the sent node type is an IAB node type, the WTRU may receive the IAB node RAR at a second type and frequency location. The first time and frequency location and/or the second time and frequency location may be indicated by the PDCCH or DCI.

Figure 9:
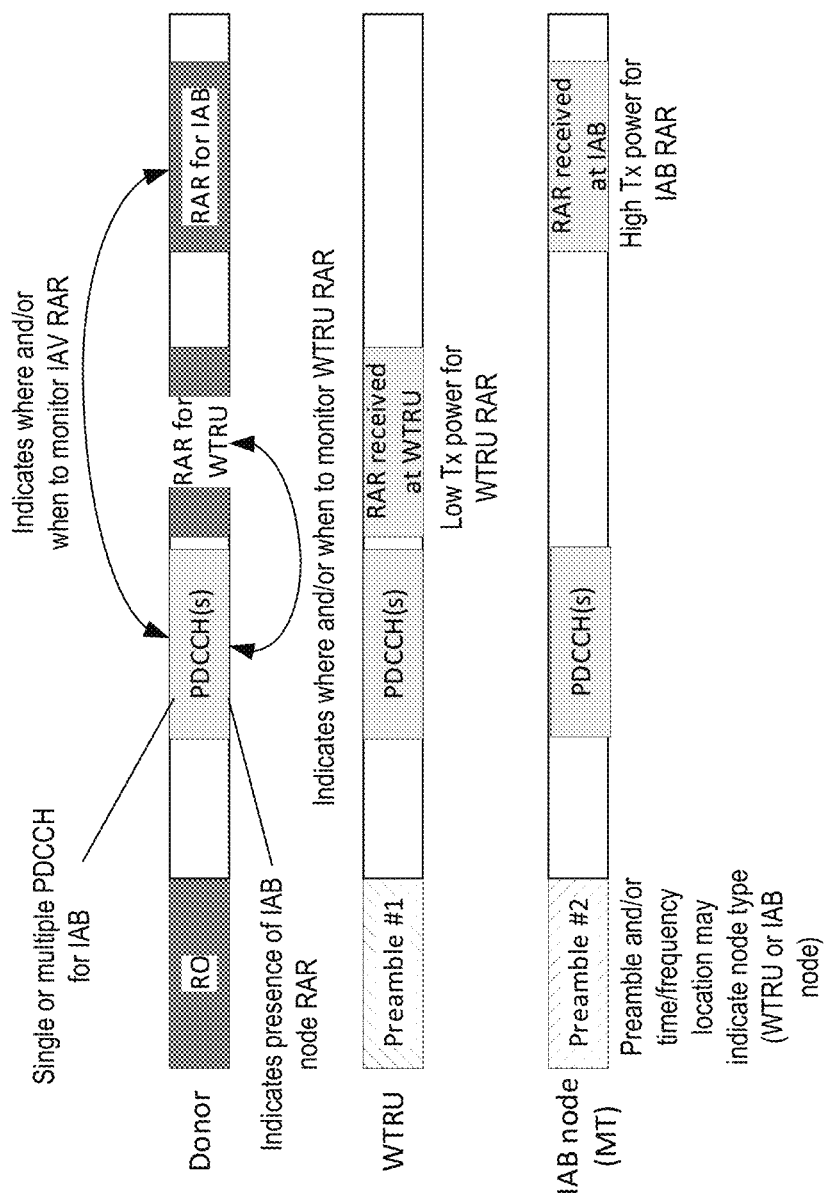
FIG. 9 illustrates an example PDCCH indicating separate RARs for WTRUs and IAB nodes.

FIG. 9 is an example RAR procedure 850 in which a PDCCH indicating separate RARs for a WTRU and an IAB node The WTRU may determine (e.g., be configured to determine) that the PDCCH indicates multiple RARs. The WTRU may determine (e.g., be configured to determine) that the PDCCH indicates a WTRU RAR and an IAB node RAR using one RA-RNTI (e.g., a common RA-RNTI for a WTRU and an IAB node) with more flags (e.g., in the PDCCH or DCI). The WTRU may receive the WTRU RAR according to a first time and frequency location. The first time and frequency location may be scheduled for the WTRU and/or indicated in PDCCH or DCI.

An RA-RNTI may be a function of node type and/or node ID, for example, to separate the RAR to a WTRU and to an IAB node. RA-RNTI may be a function of a symbol index, a slot index, a subframe index, and/or a carrier index. For example, RA-RNTI (e.g., in NR systems) may be computed as:

$$RA\text{-}RNTI = f(s\_id, t\_id, f\_id, ul\_carrier\_id) =$$
$$1 + s\_id + 14 \times t\_id + 14 \times 80 \times f\_id + 14 \times 80 \times 8 \times ul\_carrier\_id$$

where s_id may be the index of the first OFDM symbol of the specified PRACH (0≤s_id<14), t_id may be the index of the first slot of the specified PRACH in a system frame (0≤t_id<80), f_id may be the index of the specified PRACH in the frequency domain (0≤f_id<8), and ul_carrier_id may be the UL carrier used for Msg1 transmission (0 for NUL carrier and 1 for SUL carrier).

RA-RNTI may be a function of a symbol index, a slot index, a subframe index, a carrier index, and/or a node type. For example, RA-RNTI (e.g., in IAB systems) may be computed as: RA-RNTI=f(s_id, t_id, f_id, ul_carrier_id, node_id), where node_id may be node type index or node index. Node_id may represent different node types. For example, node_id may be 0 or 1. For example, node_id=0 may represent a WTRU and node_id 1 may represent an IAB node.

In examples, in order to separate the RAR to a WTRU and to an IAB node, node type may be reported. For example, the IAB node type and/or the WTRU node type may be reported (e.g., explicitly and/or implicitly). One or more of the following may apply, the IAB node type and/or the WTRU node type may be reported using payload based method, e.g., control channel, data channel, and/or feedback channel. The IAB node type and/or the WTRU node type may be reported using sequence based approach or using partitioning based approach. The IAB node type and/or the WTRU node type may be reported by Msg1.

In NR, a (e.g., each) RACH occasion may include up to 64 preamble indices. The preamble index set may be associated with an SSB. One or more (e.g., all) WTRUs that choose the same SSB may use the same preamble index set. A (e.g., each) RACH occasion (e.g., in IAB systems) may have two or more (e.g., two) types of nodes sending preambles, e.g., WTRU in access link and IAB node in backhaul link. A WTRU may send a preamble (e.g., in a RO) that indicates that the WTRU is a WTRU node type. For example, the preamble from the WTRU may include a WTRU node type indication. An IAB node may send a preamble (e.g., in a RO) that indicates that the IAB node is an IAB node type. For example, the preamble from the IAB node may include an IAB node type indication. The distance between IAB node and IAB donor node may be much larger than the distance between WTRU and IAB donor node. When a gNB determines to send an RAR, the gNB may need to know which preamble corresponds to WTRUs and which preamble corresponds to IAB nodes. The node type, e.g., WTRU or IAB node, may be reported, e.g., in Msg1. For example, node type may be reported in Msg1.

Figure 8:
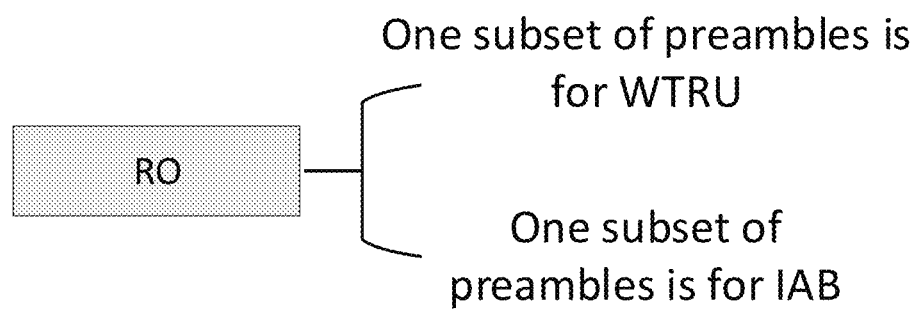
FIG. 8 illustrates an example of different subset of preambles for WTRU and IAB.

In examples, a node type (e.g., IAB node type) may be reported using preamble partitions. For example, a node (e.g., such as a WTRU, an IAB node, etc.) may indicate the node type using a preamble partition. For example, 64 preambles may be partitioned within one RACH occasion into two subsets. For example, one RACH occasion may include one partition for WTRU and the other partition for IAB node. FIG. 8 illustrates an example of different subsets of preambles 800 for WTRUs and IAB nodes. As shown in FIG. 8, preamble in one partition may indicate one node type while preamble in the other partition may indicate another node type.

In examples, a node type may be reported using resource partitioning, e.g., RO partitions. A configured RACH occasion may be partitioned into two or more subsets. For example, the configured RACH occasion may include one subset (e.g., a first partition) for WTRU and another subset (e.g., a second partition) for an IAB node. A RO in the first partition may indicate one node type (e.g. WTRU) while a RO in the second partition may indicate another node type (e.g., IAB node).

In examples, a node type may be reported using a combination of a preamble and/or ROs for partitioning. For example, a node (e.g., such as a WTRU, an IAB node, etc.) may indicate the node type using a combination of a preamble partition and an RO resource partition.

In examples (e.g., for preamble partitions), for a (e.g., each) RACH occasion, two or more roots (e.g., two roots) may be configured for preamble generation. For example, one root may be used for preambles generated by WTRUs and another root may be used for preambles generated by gNBs. A WTRU may use a first root to generate a preamble for a RACH occasion. A gNB may use a second root to generate a preamble for a RACH occasion.

In examples (e.g., for resource partitions), TDMed RACH occasions may be divided into two or more (e.g., two) subsets. For example, one subset of TDMed RACH occasions may be for WTRUs and another subset of TDMed RACH occasions may be for IAB nodes. FDMed RACH occasions may be divided into two or more (e.g., two) subsets. For example, one subset of FDMed RACH occasions may be for WTRUs and another subset may be for IAB node. FIG. 10 illustrates an example TDMed RACH occasion 900 and an example FDMed RACH occasion 950 for a WTRU and an IAB node. As shown in FIG. 10, a RACH occasion for a WTRU may be separated from a RACH occasion for an IAB node in time and/or frequency.

Hop Selection for IAB may be provided.

In examples, one or more channel condition(s) may be communicated with an IAB donor node and/or an IAB node, e.g., for hop selection. For example, a channel condition may be broadcasted, e.g., from an IAB node to a donor node and/or other IAB node(s). When an IAB node is activated, the IAB node may access the backhaul network, e.g., by performing initial access. The IAB node may measure (e.g., first measure) the signal strength of one or more different IAB nodes and/or a donor node. The IAB node may select one of the nodes as a candidate parent node to perform random access.

In examples, node type specific SSB may be used. For example, IAB node-specific SSB and/or IAB donor node-specific SSB may be used. By detecting node type specific SSB, a receiver may distinguish between different nodes and/or node types. In NR, a WTRU may access the network with one or more of the following. A WTRU may measure the RSRP of SSBs. Based on the RSRP measurement, the WTRU may select a SSB (e.g., one of the appropriate SSB). The WTRU may perform random access via a RACH, e.g., based on the selected SSB.

In examples, a IAB node may consider RSRP of received SSBs as metrics and/or other metrics for selecting the appropriate SSB. When selecting a parent node, a IAB node may consider the path condition between the selected parent and the destination.

Figure 11:
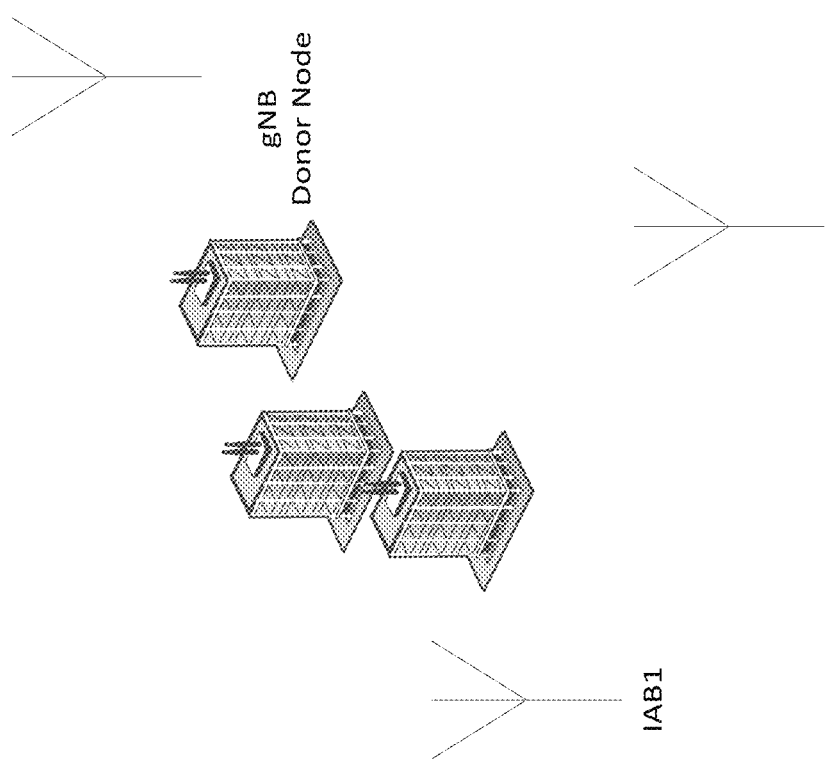
FIG. 11 illustrates an example initial access of IAB node.

FIG. 11 illustrates an example initial access 1000 of IAB node. According to RSRP value of received SSBs, IAB2 may be linked to IAB1 as IAB2 is closer to IAB1 than to donor node, as shown in FIG. 11. IAB2 may connect to the donor node, e.g., eventually. IAB2 may access donor node (e.g., access directly). For example, IAB2 may access the donor node directly (e.g., instead or in addition to) linking to IAB1 first. IAB2 may access the donor node directly, e.g., due to the pathloss between IAB node and gNB. How and/or what metric to use in choosing multi-hops to transmit (e.g., effectively transmit) the data to destination in IAB node may be considered. In NR, the RSRP of an SSB may be the metric for a WTRU cell selection. In IAB systems, RSRP of an SSB may not be sufficient for WTRU cell selection. The information about the path and/or one or more path characteristics between the candidate parent node and destination node may be communicated to a WTRU.

The channel condition may be communicated with IAB donor node. For example, the channel condition may be broadcasted from IAB node to donor node, e.g., in PBCH, RMSI, OSI, and/or like. One or more other IAB nodes and/or WTRUs may use the channel condition as part of information for selecting a candidate parent node, e.g., during initial access. For example, in FIG. 11, IAB2 may receive broadcast information and/or system information from IAB1 with channel condition from IAB1 to donor node. By combining the channel condition obtained from the broadcast information and/or the system information of IAB1 in addition to RSRP of SSB received from IAB1, and/or comparing with the RSRP of SSB received from donor node, IAB2 may decide which node, e.g., IAB1 or donor node, to access.

Timing alignment for IAB may be provided.

In examples, an SSB may be used to obtain timing advance and/or timing alignment (TA) for one or more IAB nodes in IAB systems. The one or more IAB nodes may report TA, e.g., back to parent IAB node. The one or more IAB nodes may transmit a preamble, e.g., to the parent node. The parent node may estimate TA based on the preamble.

Figure 12:
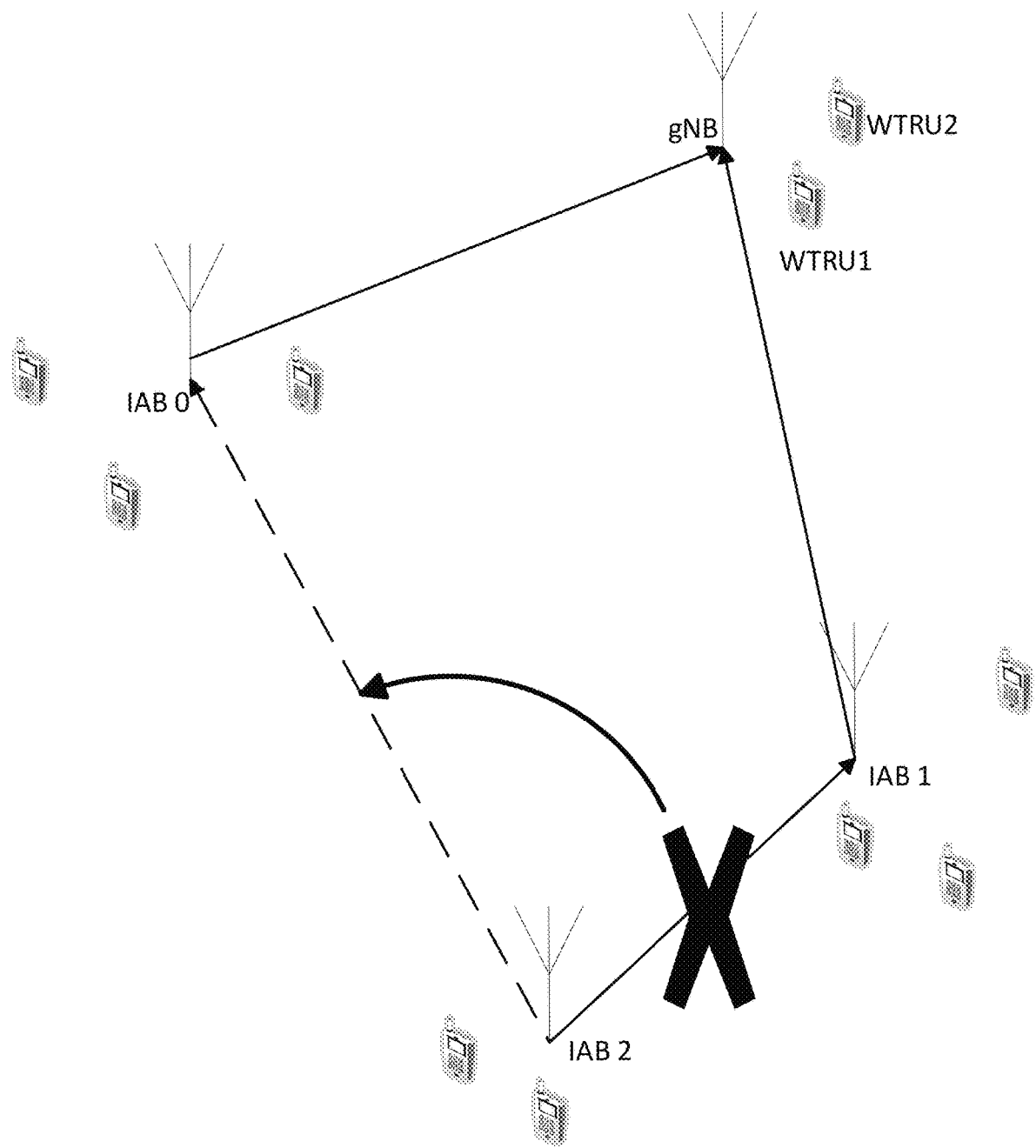
FIG. 12 illustrates an example failure of IAB node.
Figure 13:
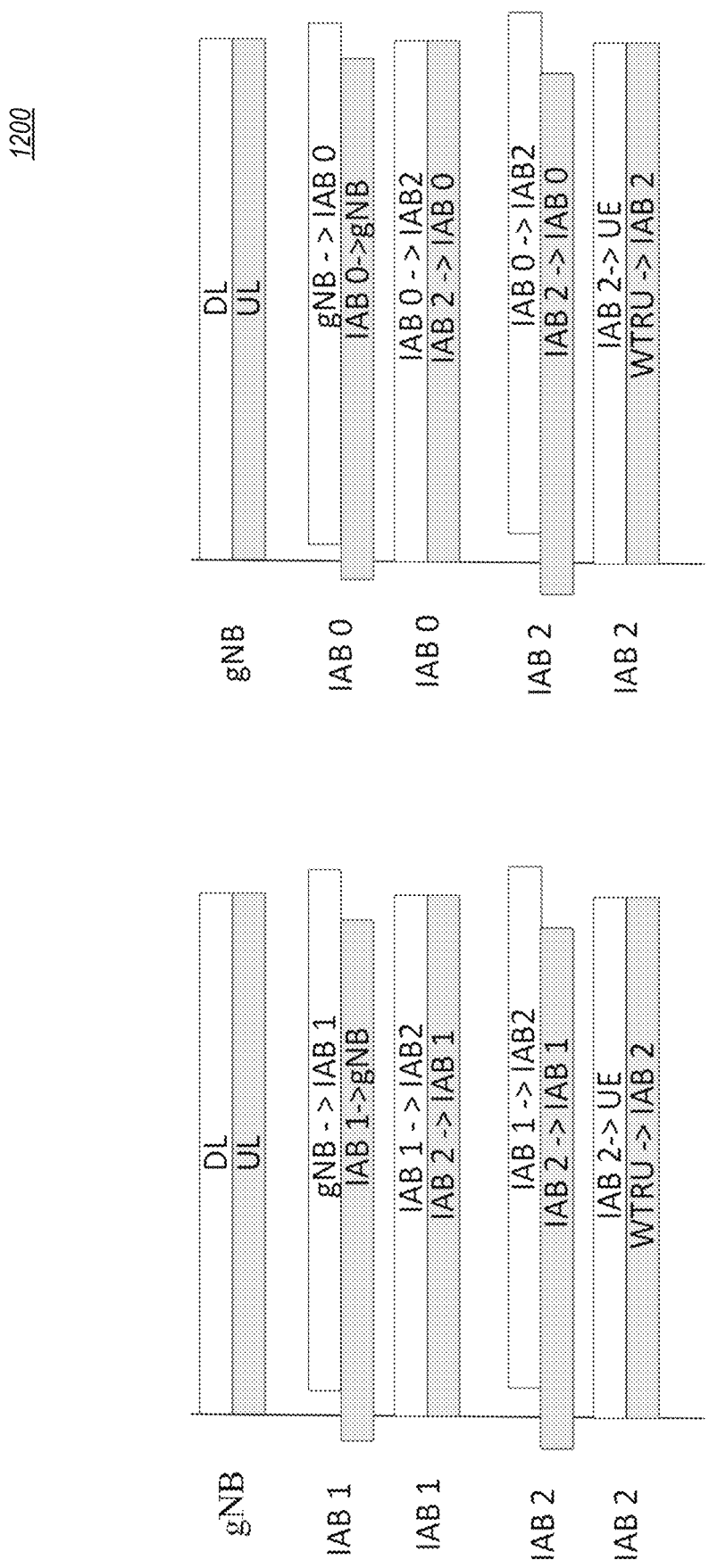
FIG. 13 illustrates an example IAB synchronization.

FIG. 12 illustrates an example IAB node failure 1100. For example, the timing of IAB2 in FIG. 12 may be given in FIG. 13. FIG. 13 illustrates an example IAB synchronization 1200. In examples, IAB2 may be linked to IAB1 as shown in FIG. 12 and the timing may be given by FIG. 13 (e.g., the left-side of FIG. 13). In examples, IAB2 may be linked to IAB1 as shown in FIG. 12 and the timing may be given by FIG. 13 (e.g., the right-side of FIG. 13). IAB2 may be linked to IAB1 at the beginning and may fail at later time. IAB2 may begin to perform initial access linking to IAB0. During IAB2 transferring link from IAB1 to IAB0, a network may consider whether and/or how to adjust the timing of transmitting and/or receiving. For example, if IAB2 is out of sync, the WTRU may continue connecting to IAB2 and/or may perform handover. The WTRU may continue connecting to IAB2. The resource allocation may be performed. Timing synchronization may be maintained. Handover may be performed. The WTRU may maintain the candidate parent nodes. The WTRU may switch parent node.

In examples, SSB may be used to obtain TA for IAB node in IAB systems. IAB node may report TA, e.g., back to parent IAB node. IAB node may transmit preamble to parent node. The parent node may estimate TA, e.g., based on the preamble. The parent IAB node may compare the TA derived from SSB, the TA reported by child IAB node, and/or the TA obtained from preamble. If the derived, reported, and/or obtained TAs are the same, TA may be confirmed. If the derived, reported, and/or obtained TAs are different, the TA obtained from preamble may override the TA derived from SSB and/or the TA reported by child IAB node. The channel between IAB2 and IAB1 may fail. If the channel between IAB2 and IAB1 fails, the timing for IAB2 sending data to WTRU may not change if IAB2 is not out of sync and/or is known to IAB2. After receiving the SSB and/or PBCH from a new candidate (e.g., IAB0), IAB2 may know the received time of DL signal and/or channel transmitted from the new candidate (e.g., IAB0) to IAB2. According to the received time of SSB transmitted from IAB0 to IAB2 and/or the transmission time for IAB2 sending DL signal/channel to WTRU, the time difference (e.g., TA) between the two time may be the delay from IAB2 to the new candidate parent node (e.g., IAB0). IAB2 may report the TA derived as described herein to a new IAB node. RACH to obtain TA between IAB2 and IAB0 may be skipped. IAB2 may transmit preamble to a new IAB node (e.g., IAB0). IAB0 may estimate the TA, e.g., based on the received preamble.

In examples, a signal may be sent to one or more WTRUs. For example, the signals to one or more WTRUs may be associated with IAB2 about the status change, the failure of a node, and/or the like.

Discovery of an IAB node may be provided.

In examples, information of a topology of backhaul network (e.g., hop order of an IAB node for coordinating and/or scheduling IAB nodes) may be used during IAB node discovery procedure. The transmission and/or reception of a IAB node (e.g., IAB donor and/or IAB node) may be based on hop order of a IAB node (e.g., or a node that may include a IAB node, a IAB donor node, a WTRU, and/or the like). Transmission and/or reception of a IAB node may be a function of hop order and/or hop index.

Figure 14:
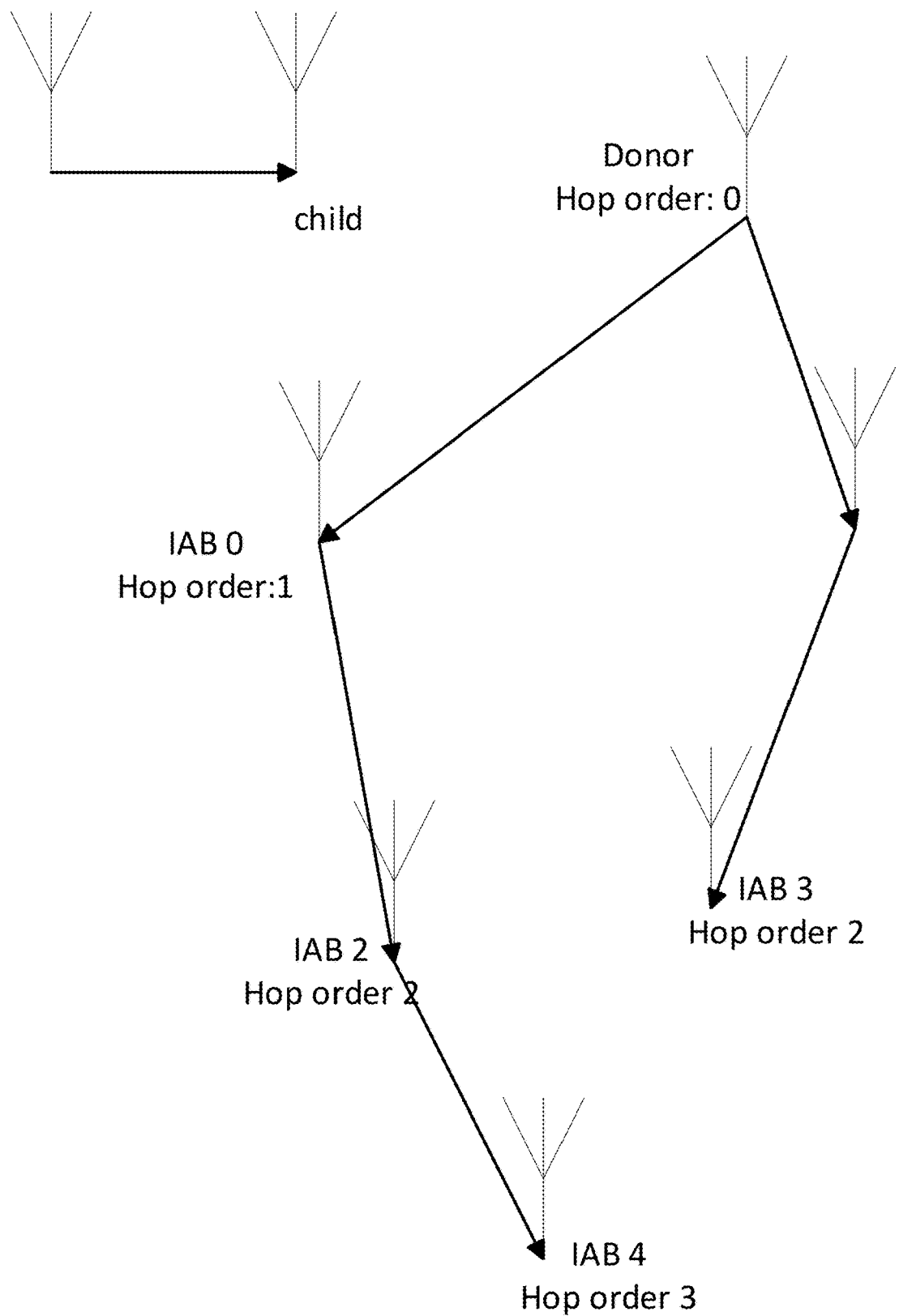
FIG. 14 illustrates an example hop orders of IAB nodes in a IAB network.

FIG. 14 illustrates example hop orders 1300 of IAB nodes in a IAB network. As shown in FIG. 14, the donor node may have hop order of 0, and the children nodes may have hop order of 1. The children of children's node may have hop order of 2. By recording the hop order, IAB node may be scheduled to measure and/or send discovery signals. The hop order may be one of the metrics for IAB node selecting the candidate parent node.

During the discovery procedure, a IAB node may be measuring one or more other IAB nodes. The IAB node may be listening and/or receiving. A IAB node may be discovered. The IAB node may be transmitting one or more discovery signals. A IAB node may not transmit and receive at the same time (e.g., due to half duplex constraint). The measure slot (e.g., slot or time for measuring) and/or discovery slot (e.g., slot or time for discovery) may be orthogonal and/or may be scheduled by a network. For example, as shown in FIG. 14, at slot 0, the IAB donor node may be sending. The children of the donor node (e.g., IAB0 and/or IAB1) may be listening. When IAB0 and/or IAB1 are listening, the children of children's node (e.g., IAB2 and IAB3) may send the discovery signal(s) to be measured by IAB4. IAB0 and/or IAB1 may be measuring IAB2 and/or IAB3. According to the hop order, IAB0 and/or IAB1 may have higher hop order than that of IAB2 and/or IAB3. IAB0 and/or IAB1 may not link to IAB2 and/or IAB3 back.

Transmission and reception for a node (e.g., IAB node) may be based on, e.g., topology information and/or may be a function of hope order. In examples, during discovery procedure, one or more IAB nodes with odd hop order may send and/or transmit discovery signal (e.g., simultaneously), and one or more other IAB nodes with even hop order may receive discovery signal (e.g., simultaneously). In examples, during procedure, one or more IAB nodes with even hop order may send and/or transmit discovery signal (e.g., simultaneously), and one or more other IAB nodes with odd hop order may receive discovery signal (e.g., simultaneously). The hop order of an IAB node may be calculated. For example, the hop order of an IAB node may be calculated as the hop order of its parent node plus one. IAB node may broadcast hop order of its own and/or others, e.g., in PBCH, RMSI, OSI, and/or the like. For example, the donor node may set the hop order to be zero and/or may broadcast hop order in PBCH. The IAB node, that is going to link to the donor node, may set its hop order to be one and may broadcast hop order, e.g., in PBCH, RMSI, OSI, and/or the like, and so on. Hierarchy design of SSB may be used. Hop order may be indicated, e.g., during initial access and/or random access procedures. For example, hop order and/or topology information may be communicated (e.g., in 2-step RACH or 4-step RACH).

Although the features and elements of the present invention are described in the preferred embodiments in particular combinations, each feature or element may be used alone without the other features and elements of the preferred embodiments or in various combinations with or without other features and elements of the present invention.

Although the solutions described herein consider LTE, LTE-A, New Radio (NR), or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), the WTRU comprising:
a memory; and
a processor, the processor configured to:
send a preamble in a random access occasion (RO), wherein one or more of the preamble and an RO resource partition of the RO indicate a node type of the WTRU;
receive a physical downlink control channel (PDCCH) transmission that indicates a first scheduling information for a WTRU random access response (RAR) and a second scheduling information for an integrated access and backhaul (IAB) RAR;
determine, using the first scheduling information and the second scheduling information, a power information that indicates that the IAB RAR is associated with a higher level of transmit power than the WTRU RAR; and
receive the WTRU RAR using the first scheduling information and the power information.

2. The WTRU of claim 1, wherein the processor is further configured to:
receive, the IAB RAR using the second scheduling information and the power information.

3. The WTRU of claim 1, wherein the RO resource partition comprises one or more of a first RO resource partition that indicates a WTRU node type and a second RO resource partition that indicates an IAB node type.

4. The WTRU of claim 1, wherein a combination of the preamble and the RO resource partition is used to indicate the node type of the WTRU.

5. The WTRU of claim 1, wherein the WTRU RAR is received at a lower transmit power than the IAB RAR.

6. The WTRU of claim 2, wherein the first scheduling information is associated with a a first random access radio network temporary identifier (RA-RNTI) and the second scheduling information is associated with a second RA-RNTI.

7. The WTRU of claim 6, wherein the PDCCH transmission further indicates the first RA-RNTI and the second RA-RNTI.

8. A method performed by a wireless transmit/receive unit (WTRU), the method comprising:
sending, by the WTRU, a preamble in a random access occasion (RO), wherein one or more of the preamble or an RO resource partition of the RO indicate a node type of the WTRU;
receiving, by the WTRU, a physical downlink control channel (PDCCH) transmission that indicates a first scheduling information for a WTRU random access response (RAR) and a second scheduling information for an integrated access and backhaul (IAB) RAR;
determining, by the WTRU, using the first scheduling information and the second scheduling information, a power information that indicates that the IAB RAR is associated with a higher level of transmit power than the WTRU RAR; and
receiving, by the WTRU, the WTRU RAR using the first scheduling information and the power information.

9. The method of claim 8, wherein the method further comprises receiving, by the WTRU, the IAB RAR using the second scheduling information and the power information.

10. The method of claim 8, wherein the RO resource partition comprises one or more of a first RO resource partition that indicates a WTRU node type and a second RO resource partition that indicates an IAB node type.

11. The method of claim 8, wherein the WTRU RAR is received at a lower transmit power than the IAB RAR.

12. The method of claim 9, wherein the first scheduling information is associated with a a first random access radio network temporary identifier (RA-RNTI) and the second scheduling information is associated with a second RA-RNTI.

13. The method of claim 12, wherein the PDCCH transmission further indicates the first RA-RNTI and the second RA-RNTI.

* * * * *